US010807847B2

(12) United States Patent
Ourada et al.

(10) Patent No.: US 10,807,847 B2
(45) Date of Patent: Oct. 20, 2020

(54) ALL TERRAIN VERSATILE TELESCOPIC FORK LIFT

(71) Applicants: Tim Ourada, Mascotte, FL (US); Terri Ourada, Mascotte, FL (US)

(72) Inventors: Tim Ourada, Mascotte, FL (US); Terri Ourada, Mascotte, FL (US)

(73) Assignee: Teletrax Equipment, LLC, Cedar Rapids, IA (US)

( * ) Notice: Subject to any disclaimer, the term of this patent is extended or adjusted under 35 U.S.C. 154(b) by 392 days.

(21) Appl. No.: 15/920,617

(22) Filed: Mar. 14, 2018

(65) Prior Publication Data

US 2019/0322506 A1    Oct. 24, 2019

(51) Int. Cl.
*B66F 9/065* (2006.01)
*B62D 12/00* (2006.01)
(Continued)

(52) U.S. Cl.
CPC ............ *B66F 9/0655* (2013.01); *B62D 11/20* (2013.01); *B62D 12/00* (2013.01);
(Continued)

(58) Field of Classification Search
CPC .. B66F 9/0655; B66F 9/07513; B66F 9/0759; B66F 9/22; B66F 9/07568; B66F 9/07586; B66F 9/07559; B66F 9/105; B66F 9/07545; B66F 9/07577; B62D 55/0655; B62D 11/20; B62D 12/00; B62D 55/116

See application file for complete search history.

(56) References Cited

U.S. PATENT DOCUMENTS

| | | | | |
|---|---|---|---|---|
| 3,414,072 A | * | 12/1968 | Hodges, Jr. ............ | B62D 59/04 180/24 |
| 3,435,908 A | * | 4/1969 | Sunderlin ............. | E02F 9/0841 180/9.44 |

(Continued)

OTHER PUBLICATIONS

PCT/US2019/020747, PCT Notification of Transmittal of the International Search Report and the Written Opinion of the International Searching Authority, or the Declaration, International Filing Date, Mar. 5, 2019, dated Jun. 19, 2019, 12 pages.

*Primary Examiner* — Darlene P Condra
(74) *Attorney, Agent, or Firm* — Smith Tempel Blaha LLC; Matthew T. Hoots

(57) ABSTRACT

Vehicles, systems and methods for providing articulating two section vehicles with tracks, and a front body attached superstructure with telescopic forklift, for use on all terrain condition applications. The vehicle can include front and rear track assemblies that can tilt up and down while traveling over different ground surfaces. Each of the track assemblies can have rotatable articulating/oscillating track wheels which can traverse different contoured surfaces. The right and left tracks on both the front and rear track assemblies can separately extend outward and inward from underneath the vehicles to add stability to the vehicles. The cab can be raised and lowered to add greater visibility for the operator. Hydraulics can be used for raising and lowering the extendable boom and operator cab, as well as controlling the body articulating hinge, the articulating tracks and the tilting controls for the front track assembly.

18 Claims, 16 Drawing Sheets

(51) Int. Cl.
*B62D 11/20* (2006.01)
*B62D 55/065* (2006.01)
*B66F 9/075* (2006.01)
*B66F 9/22* (2006.01)

(52) U.S. Cl.
CPC ........ *B62D 55/0655* (2013.01); *B66F 9/0759* (2013.01); *B66F 9/07513* (2013.01); *B66F 9/07559* (2013.01); *B66F 9/07568* (2013.01); *B66F 9/07586* (2013.01); *B66F 9/22* (2013.01)

(56) References Cited

U.S. PATENT DOCUMENTS

| | | | |
|---|---|---|---|
| 3,451,494 A * | 6/1969 | Kowalik | B62D 55/0655 414/697 |
| 3,741,331 A * | 6/1973 | Kowalik | B62D 55/0655 180/9.44 |
| 3,763,938 A * | 10/1973 | Brodersen | E02F 3/764 172/789 |
| 3,782,491 A * | 1/1974 | Herbenar | B60B 35/003 180/435 |
| 3,789,945 A * | 2/1974 | Hansen | B60G 99/004 180/69.2 |
| 3,957,165 A | 5/1976 | Smith | |
| 4,194,584 A | 3/1980 | Kress et al. | |
| 4,632,630 A | 12/1986 | Maki et al. | |
| 4,823,852 A | 4/1989 | Langford | |
| 5,113,958 A | 5/1992 | Holden | |
| 5,180,028 A | 1/1993 | Perrenoud, Jr. | |
| 5,427,195 A * | 6/1995 | Paul | B60K 17/30 180/242 |
| 5,489,114 A * | 2/1996 | Ward | B60B 35/1054 280/638 |
| 5,607,210 A * | 3/1997 | Brazier | B62D 55/04 305/131 |
| 5,632,350 A | 5/1997 | Gauvin | |
| 5,890,557 A | 4/1999 | Glass et al. | |
| 6,024,232 A | 2/2000 | Helgesson | |
| 6,116,362 A * | 9/2000 | Schubert | B62D 11/20 180/9.44 |
| 6,213,490 B1 * | 4/2001 | Lykken | B62D 53/02 180/235 |
| 7,195,126 B2 | 3/2007 | Maruyama | |
| 7,584,812 B2 * | 9/2009 | Radke | B60G 17/005 180/9.5 |
| 7,690,738 B2 | 4/2010 | Wilt | |
| 7,780,197 B2 | 8/2010 | White | |
| 7,963,361 B2 | 6/2011 | Coers et al. | |
| 7,997,369 B2 | 8/2011 | Bacon et al. | |
| 8,430,188 B2 * | 4/2013 | Hansen | B62D 55/30 180/9.26 |
| 8,504,251 B2 | 8/2013 | Murota | |
| 8,888,122 B2 | 11/2014 | Berry | |
| 9,522,708 B2 | 12/2016 | He et al. | |
| 9,630,664 B2 | 4/2017 | Hellholm et al. | |
| 9,682,736 B1 | 6/2017 | Prickel et al. | |
| 2010/0044124 A1 | 2/2010 | Radke et al. | |
| 2015/0096955 A1 | 4/2015 | Risen | |
| 2015/0102569 A1 * | 4/2015 | Slawson | A01M 7/0042 280/5.514 |
| 2017/0217745 A1 | 8/2017 | Artoni et al. | |
| 2017/0291802 A1 | 10/2017 | Hao et al. | |
| 2018/0037278 A1 | 2/2018 | Cox | |

* cited by examiner

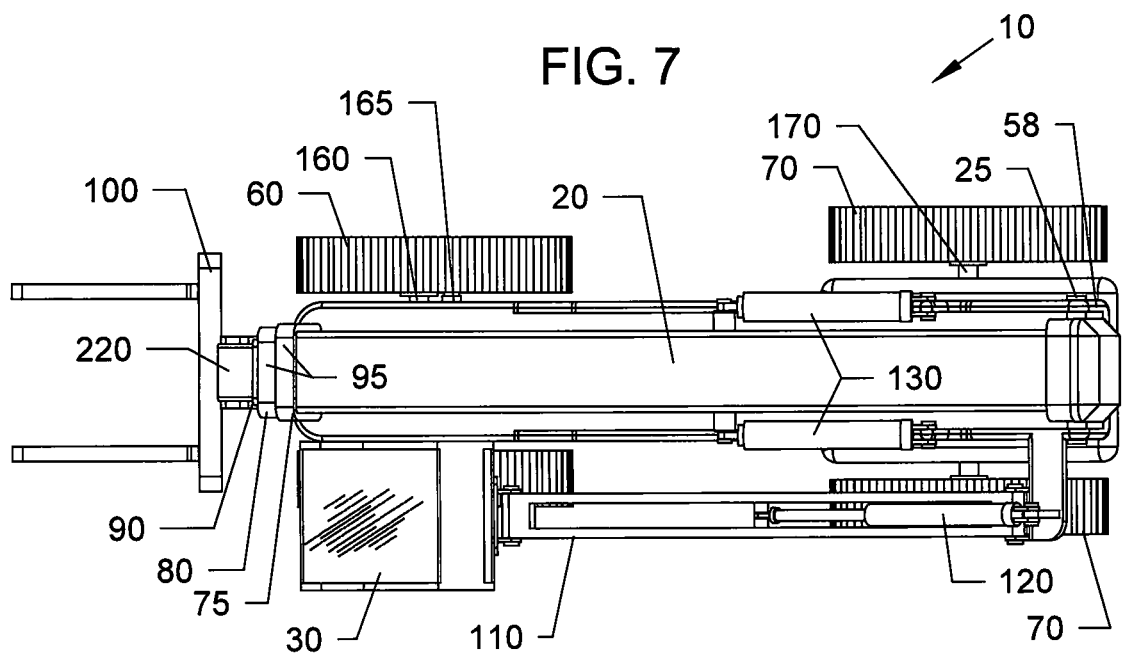
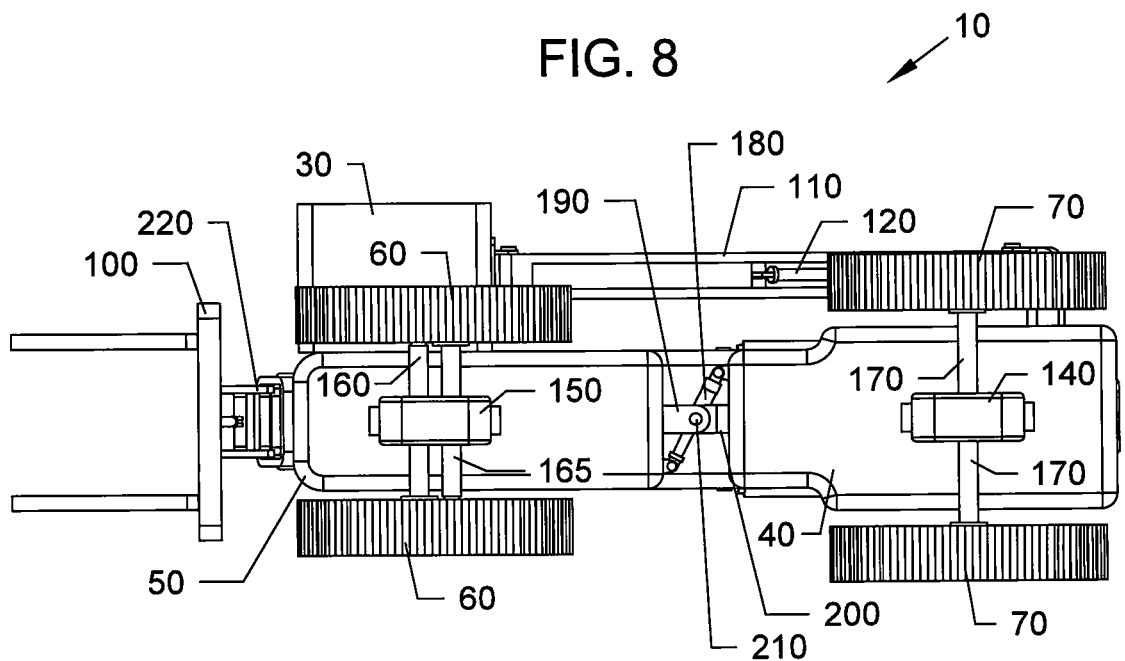

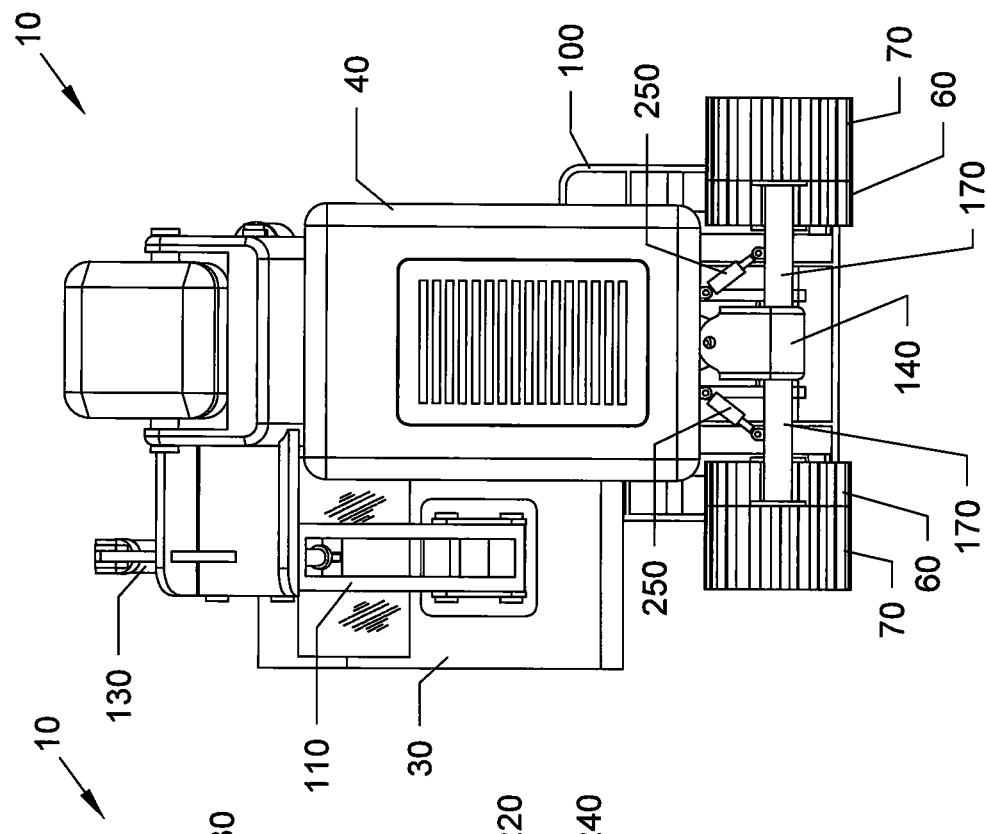
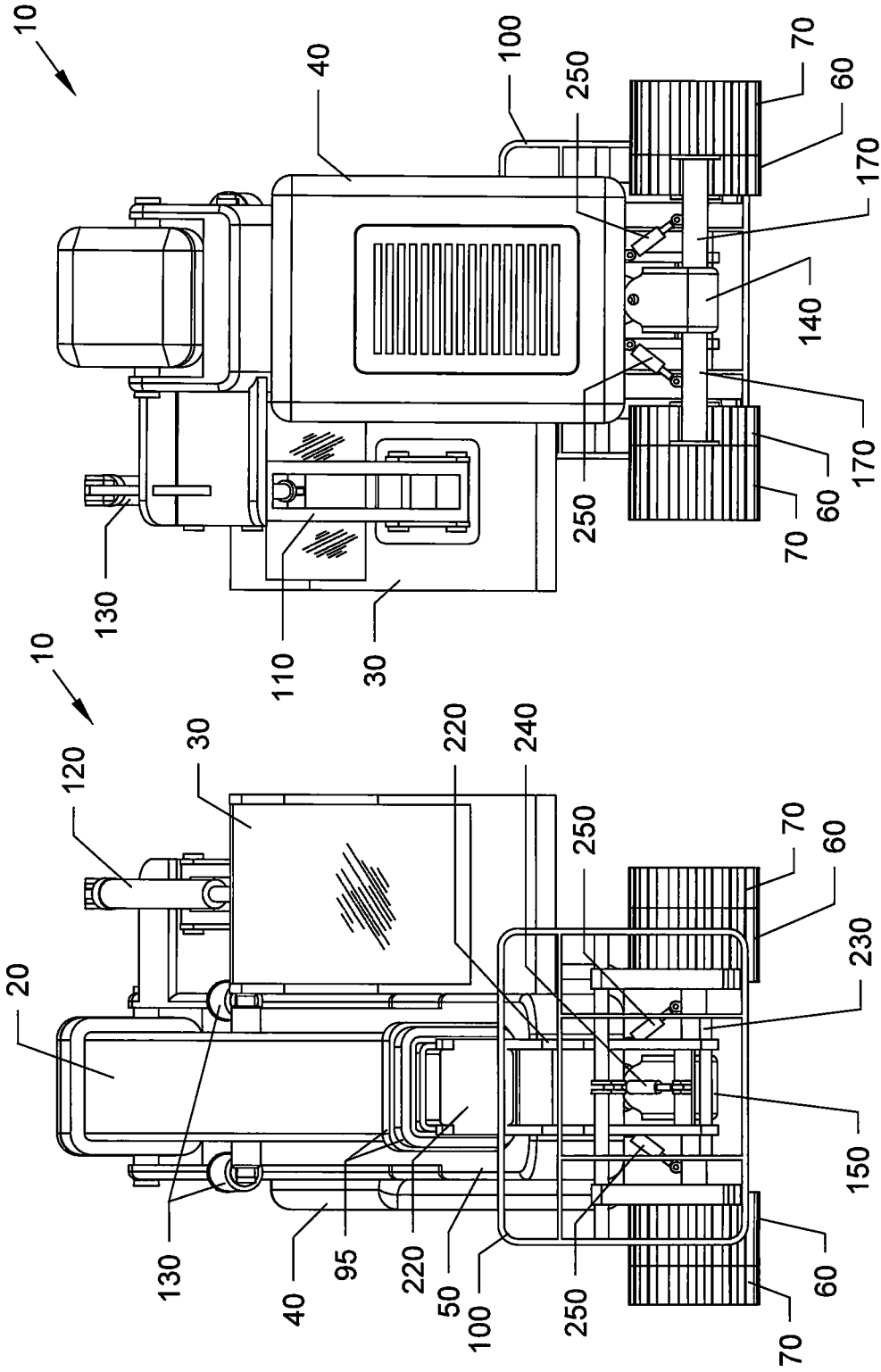

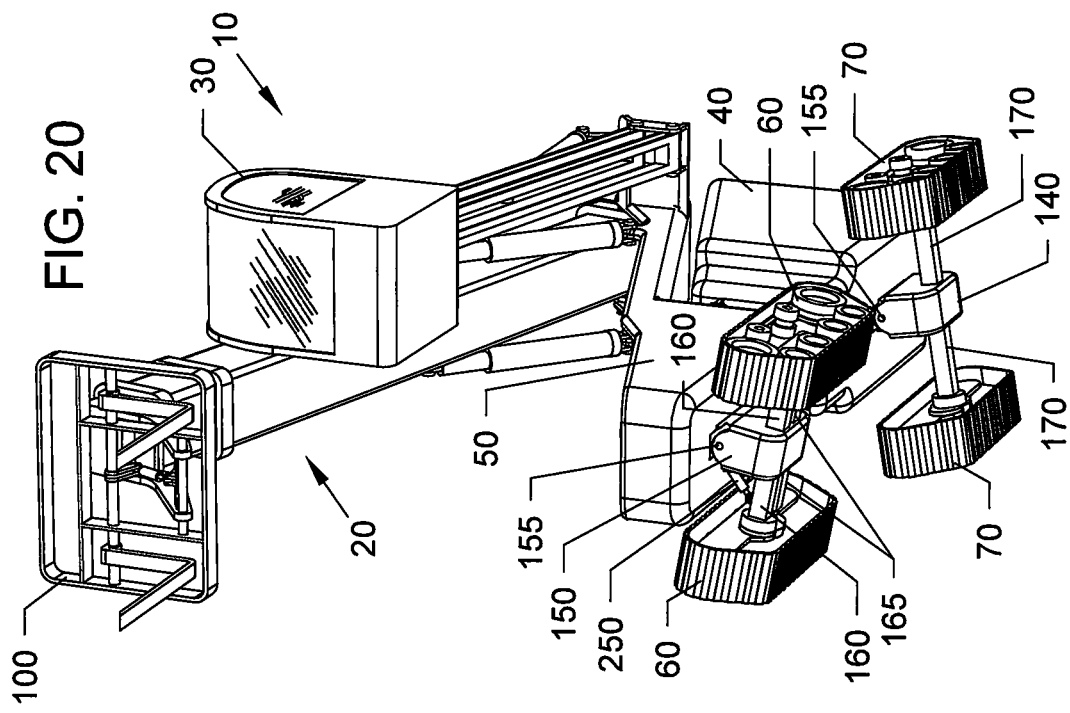
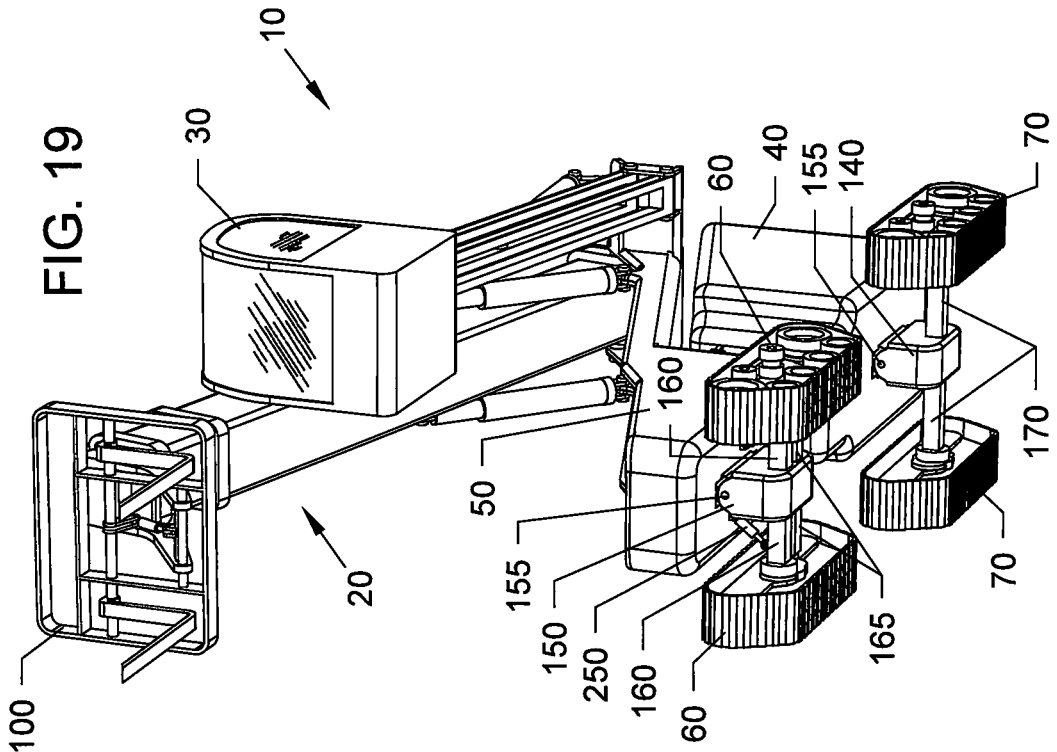

ALL TERRAIN VERSATILE TELESCOPIC FORK LIFT

FIELD OF INVENTION

This invention relates to forklift vehicles, and in particular to vehicles, systems and methods for providing articulating two section vehicles each having track wheels with a front body attached superstructure with telescopic forklift, raiseable and lowerable boom, articulating tracks and tiltable track assemblies for all terrain condition applications.

BACKGROUND AND PRIOR ART

Common types of forklift vehicles have required the use of tire wheels to support the vehicle over ground surfaces, and often use fixed cabs. However, the use of wheel tires can and fixed cabs can cause different problems.

For example, the narrow width tires can cause the forklift vehicle to not be stable while traversing rough ground surfaces. Additionally, the tires wheels can sink into wet or soft earth and can cause the vehicle to sink and become stuck in the mud, etc. Additionally, sinking side wheels can allow for the forklift to topple over. These negative results from using tires can result in higher insurance costs based on accident damage to the forklift vehicles and operators/drivers as well as increased labor costs and the resulting down time to complete construction projects.

As for the fixed cabs, the driver/operator in the cab is limited to poor visibility conditions, since the cab is generally fixed in place on one side of the forklift vehicle. For example, this fixed location does not allow the driver operator to always be able to see conditions on the opposite side of the forklift vehicle. Having blind spots or limited visibility can result in the forklift vehicles having accidents.

Thus, the need exists for solutions to the above problems with the prior art.

SUMMARY OF THE INVENTION

A primary objective of the present invention is to provide vehicles, systems and methods for providing articulating two section vehicles, each having track wheels, with a front body attached superstructure with telescopic forklift, for all terrain condition applications.

A secondary objective of the present invention is to provide vehicles, systems and methods for providing articulating two section vehicles, each having track wheels that are tiltable for all terrain condition applications.

A third objective of the present invention is to provide all terrain vehicles, systems and methods, having side extendable axles with tracks for increasing the vehicle footprint to provide stability to the vehicle.

A fourth objective of the present invention is to provide all terrain vehicles, systems and methods, with rotatable articulating/oscillating track wheels which can traverse different contoured surfaces.

A fifth objective of the present invention is to provide all terrain vehicles, systems and methods, with a raisable and lowerable cab.

An all terrain vehicle, can include a front body with a front pair of tracks, a rear body with an engine compartment and a rear pair of tracks, an articulating hinge attached to a rear portion of the front body and a front portion of the rear body for allowing the front body and the rear body to articulate to one another, an angled superstructure on the front body extending upwardly and rearwardly over the rear body, an extendable boom having an inner end attached to an upper outer extended end of the angled superstructure, and a forklift attached to an outer end of the boom, wherein the forklift can be raised and lowered by the boom hinge.

The front pair of tracks can include a front middle bracket being pivotally attached to a front pivot point underneath the front body, a front right axle housing for attaching the front middle bracket to a right front track, and a front left axle housing for attaching the front middle bracket to a left front track, wherein the middle bracket allows for the front left track and the front right track of front pair of tracks to tilt up and down relative to the front body while the vehicle is traversing over uneven ground surfaces.

The all terrain vehicle can include a tilting control for controlling tilting angle of the front pair of tracks. The tilting control can include hydraulics.

The rear pair of tracks can include a rear middle bracket being pivotally attached to a rear pivot point underneath the rear body, a rear right axle housing for attaching the rear middle bracket to a rear right track, and a rear left axle housing for attaching the rear middle bracket to a left rear track, wherein the rear middle bracket allows for the rear left track and the rear right track of rear pair of tracks to tilt up and down relative to the rear body while the vehicle is traversing over uneven ground surfaces.

The front pair of tracks can include a front middle bracket being attached underneath the front body, a front right axle housing having an inner end attached to the front middle bracket, and a right outer articulating end for allowing a right front track assembly to articulate relative to the right front axle housing, and a front left axle housing having an inner end attached to the front middle bracket, and a left outer articulating end for allowing a left front track assembly to articulate relative to the left front axle housing, so that each of the right front track assembly and the left front track assembly articulate up and down over raised obstacles on a ground surface.

The vehicle can include a right oscillating lock for locking the right front track assembly in a fixed articulated right side orientation position, and a left oscillating lock for locking the right front track assembly in a fixed articulated left side orientation position.

The extendable boom can include telescoping boom members for allowing the forklift to extend outward and inward relative to the upper outer extended end of the angled superstructure on the vehicle.

The all terrain vehicle of claim 10, further comprising a hinge member for allowing the boom to hinge up and down relative to the upper outer extended end of the angled superstructure.

The boom telescoping members can include hydraulic cylinders

The all terrain vehicle can include an articulating control for controlling articulating angle orientation of the articulating hinge attached between the front body and the rear body.

The articulating control can include telescoping members for the controlling of the articulating angle orientation of the articulating hinge attached between the front body and the rear body. The telescoping members can include hydraulic cylinders.

The all terrain vehicle can include a cab for housing a vehicle operator, and an arm having a first hinged end for attachment to the cab, and a second hinged end for attachment to a side portion of the upper outer extended end of the angled superstructure, wherein the arm with the first hinged end and the second hinged end allows for the cab to articulate up to a raised position and down to a lowered position so that the cab in the raised position allows for visibility of both sides of the vehicle.

The all terrain vehicle can include arm telescoping members for controlling the cab to articulate up to the raised position and down to the lowered position. The arm telescoping members can include hydraulic cylinders.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 7 is a top view of the vehicle of FIG. 5.

FIG. 8 is a bottom view of the vehicle of FIG. 5.

FIG. 9 is a front view of the vehicle of FIG. 5.

FIG. 10 is a rear view of the vehicle of FIG. 5.

FIG. 19 is a bottom right perspective view of the vehicle of the preceding figures showing the axle's and tracks parallel to one another and parallel to the superstructure.

FIG. 20 is another perspective view of FIG. 19, showing how the axles and tracks rotate about the axle hinge pins.

DESCRIPTION OF THE PREFERRED EMBODIMENTS

Figure 1:
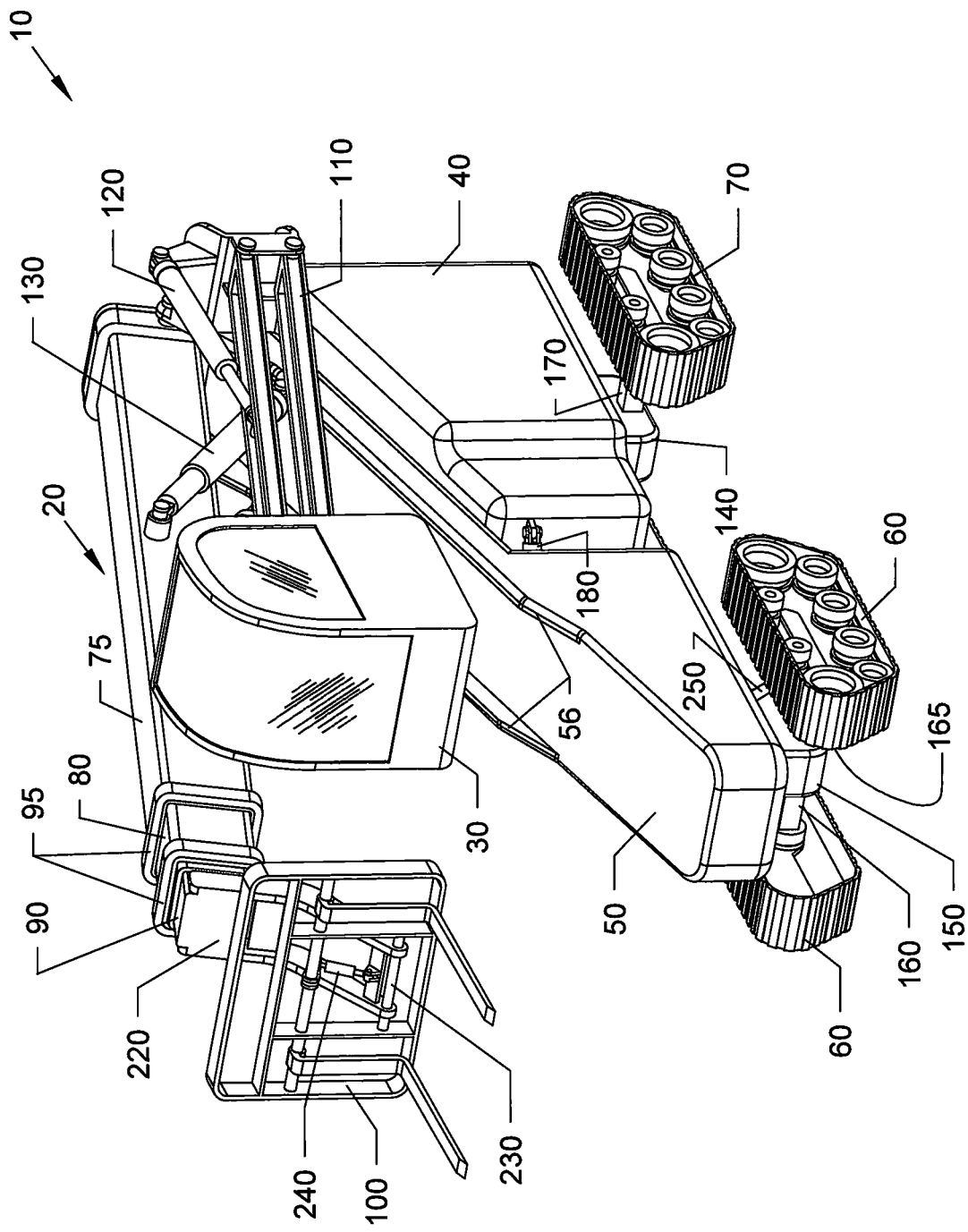
FIG. 1 is a front right perspective view of the all terrain versatile telescopic forklift vehicle with articulating cab and boom slightly raised with boom retracted.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 All terrain vehicle with articulating tracks, bodies, boom, and cab.

20 Telescoping boom.

30 Cab raises and lowers on hydraulic power.

40 Rear body/Engine compartment.

50 Front body/Superstructure is the foundation of the front tracks, the articulating boom, and the articulating cab, with the superstructure connected to the engine compartment with a hinge bracket.

54 upper portion bracket

56 raised sides

58 upper end brackets of superstructure

60 Front track assembly. Front tracks are able to rotate about the axle center-line and lock in position.
70 Rear track assembly. Rear tracks are able to rotate about the axle center-line but can not lock into position.
75 Large boom section.
80 Middle boom section.
90 Small boom section.
95 Boom stops.
100 Fork assembly.
110 Cab linkage raises and lowers the cab while keeping it level to the superstructure by means of a hydraulic cylinder.
112 lower hinged bracket
118 upper hinged bracket
120 Hydraulic cylinder for cab articulation.
130 Hydraulic cylinders for raising and lowering the boom.
140 Rear track bracket is attached to the bottom of the engine compartment via a hinge pin. This enables the rear tracks and transmission to rotate in a plane perpendicular to the bottom of the engine compartment thereby keeping the Telehandler level on uneven ground. This rotation is free to follow the angle of the superstructure as it adjusts to ground level conditions.
150 The front track bracket is attached to the bottom of the superstructure in the same why as the rear transmission. Additionally, there are two hydraulic cylinders linking the transmission to the superstructure. These cylinders are controlled by the operator to keep the superstructure relatively level regardless of ground conditions. As previously mentioned, the engine compartment is free to self-adjust and follow the orientation of the superstructure.
155 bracket hinge pin.
160 Front left axle housing. The front track transmission houses two outer axle housings. Each housing contains one extendable inner axle, one for the left axle and one for the right axle. These individual axles telescope enabling the tracks to move away from the superstructure giving them a wider footprint and adding stability to the superstructure.
163 Front left extendable inner axle. Inner axle telescopes out of axle housing to place track further away from the superstructure for increased stability.
165 Front right axle housing.
167 Front right extendable inner axle.
170 Rear axle. The rear track bracket houses one non-extendable axle for each track.
180 A hydraulic cylinder connects the superstructure and the engine compartment allowing the operator to control the angle orientation of one to the other.
190 The superstructure hinge bracket connects to engine compartment hinge bracket with a pivot pin so that the two can articulate about the pin.
200 Engine compartment hinge bracket.
210 Hinge bracket pivot pin.
220 Fork bracket is attached to the end of the small boom section. This bracket also attaches to the for assembly via a hinge pin so that the fork bracket may articulate forward and backward by way of a hydraulic cylinder controlled by the operator. Prior art.
230 Fork assembly hinge pin.
240 Fork assembly hydraulic cylinder.
250 Front track transmission hydraulic cylinders. These cylinders orient the front transmission to the superstructure by about the transmission pivot pin. They are controlled by the operator.
260 Ground that is not level.
270 Relatively level ground.
280 Rock, log, or other obstacle.

Figure 2:
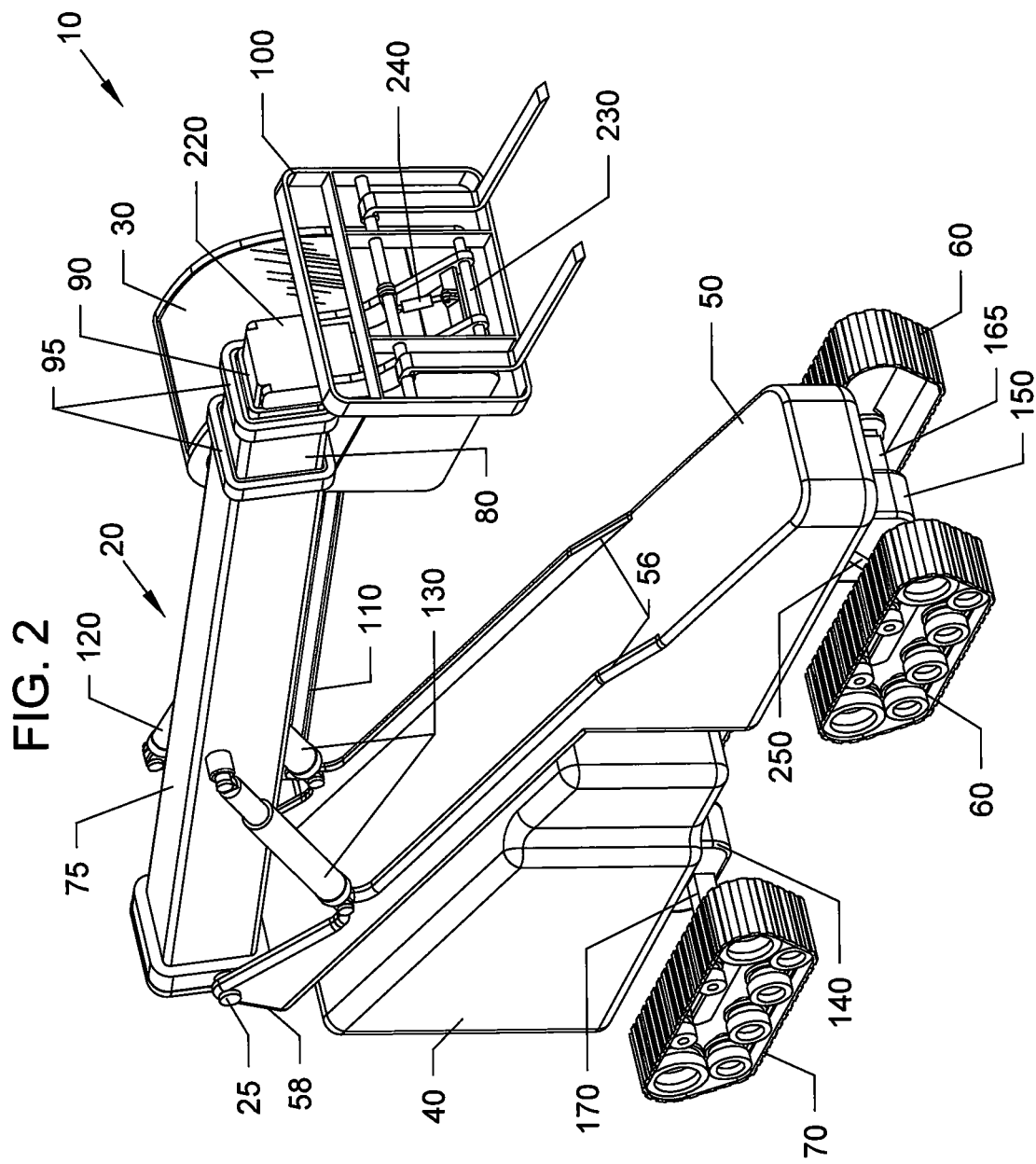
FIG. 2 is a front left perspective view of the vehicle of FIG. 1.
Figure 3:
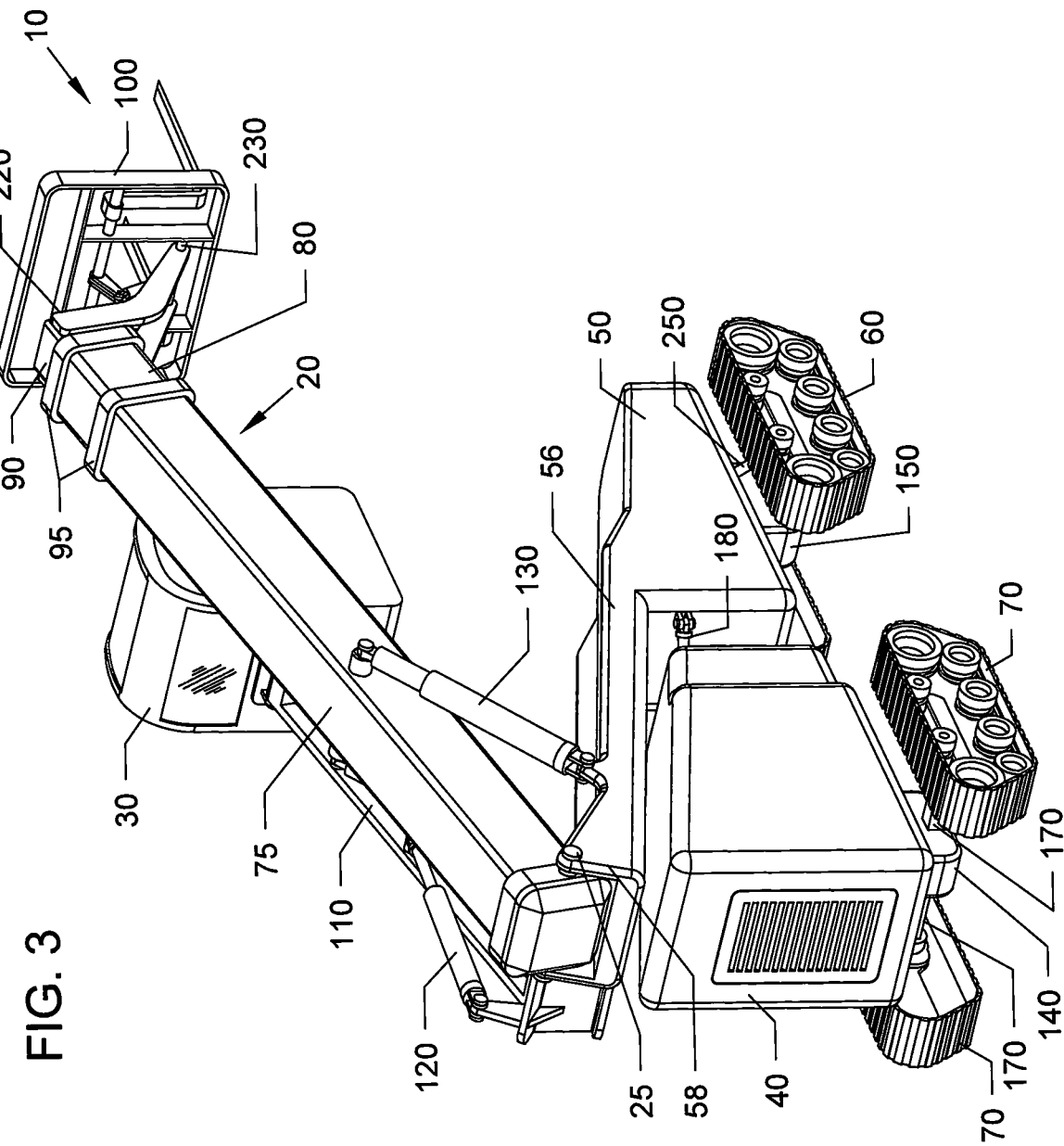
FIG. 3 is a rear right perspective view of the vehicle of FIG. 1.
Figure 4:
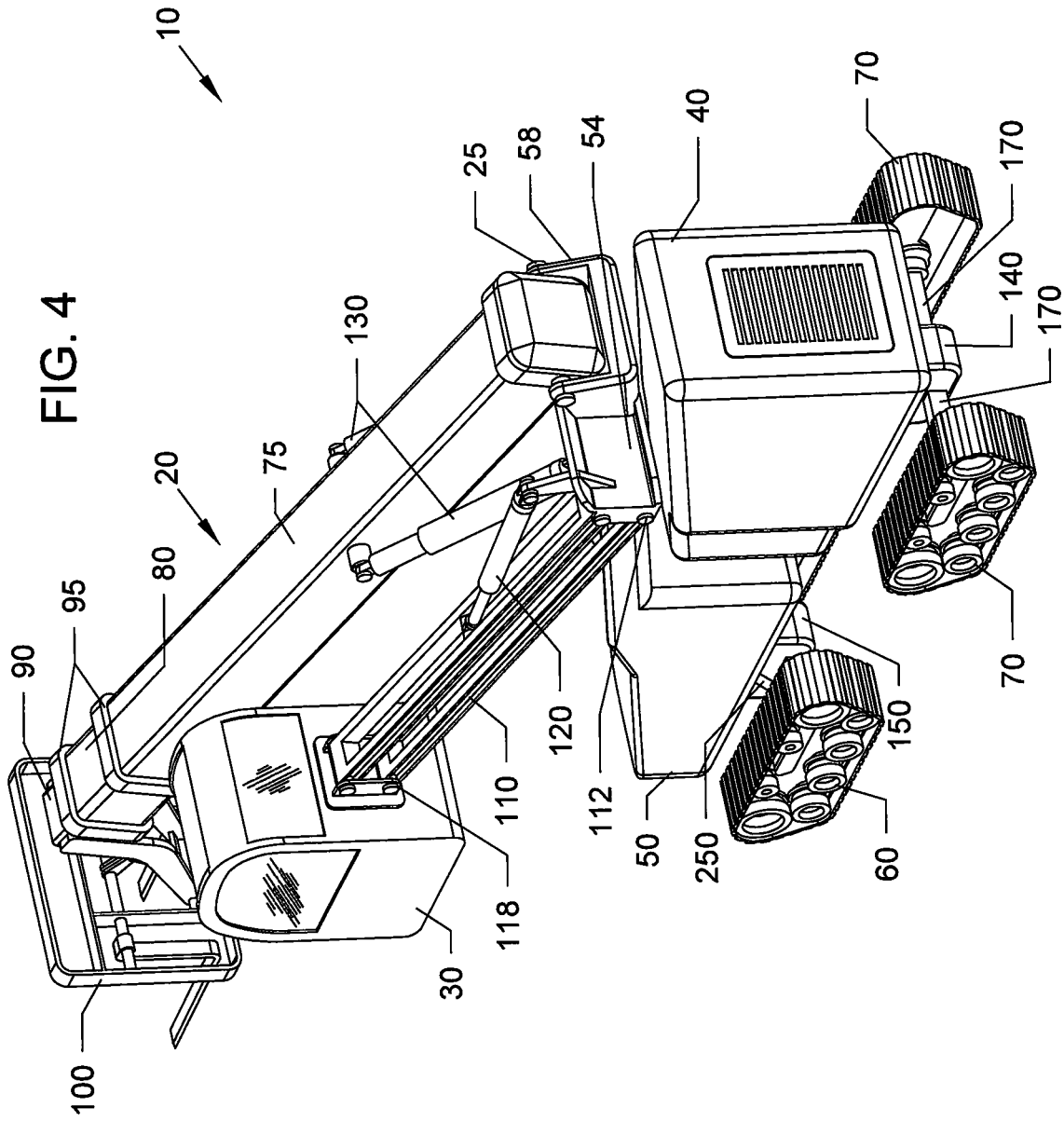
FIG. 4 is a rear left perspective view of the vehicle of FIG. 1.

FIG. 1 is a front right perspective view of the novel all terrain versatile telescopic forklift vehicle 10 with articulating cab 30 and telescoping boom 20 slightly raised with telescopic boom 20 in a retracted position. FIG. 2 is a front left perspective view of the vehicle 10 of FIG. 1. FIG. 3 is a rear right perspective view of the vehicle 10 of FIG. 1. FIG. 4 is a rear left perspective view of the vehicle 10 of FIG. 1.

Figure 5:
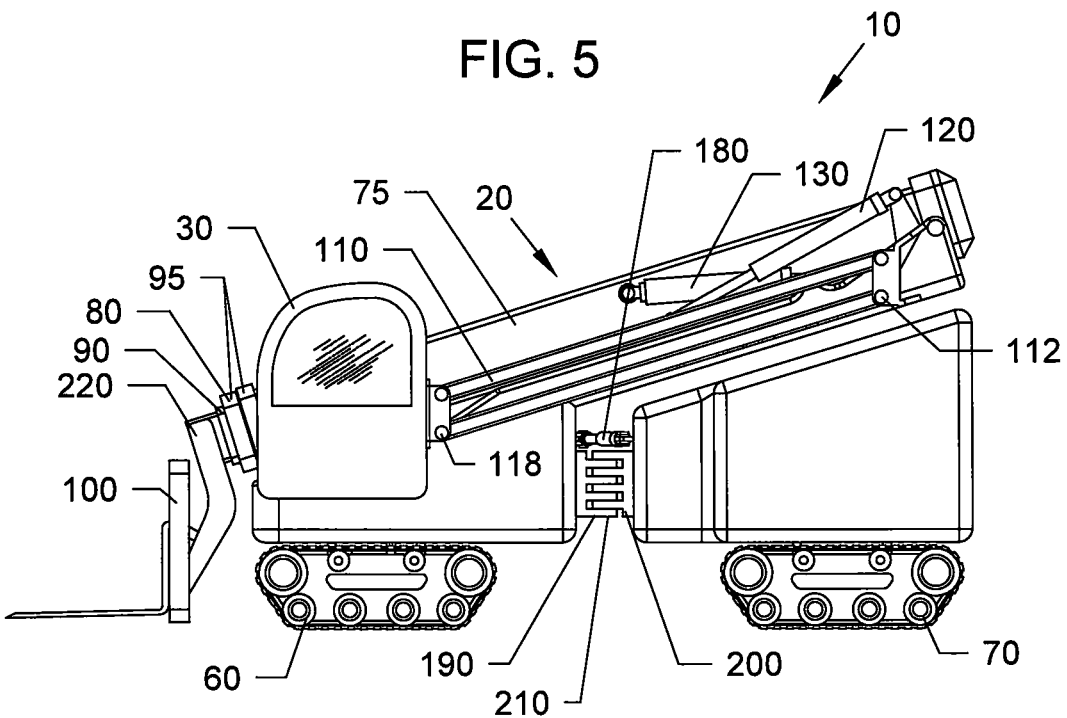
FIG. 5 is a right side view of the vehicle of FIG. 1 with cab and boom in down position.
Figure 6:
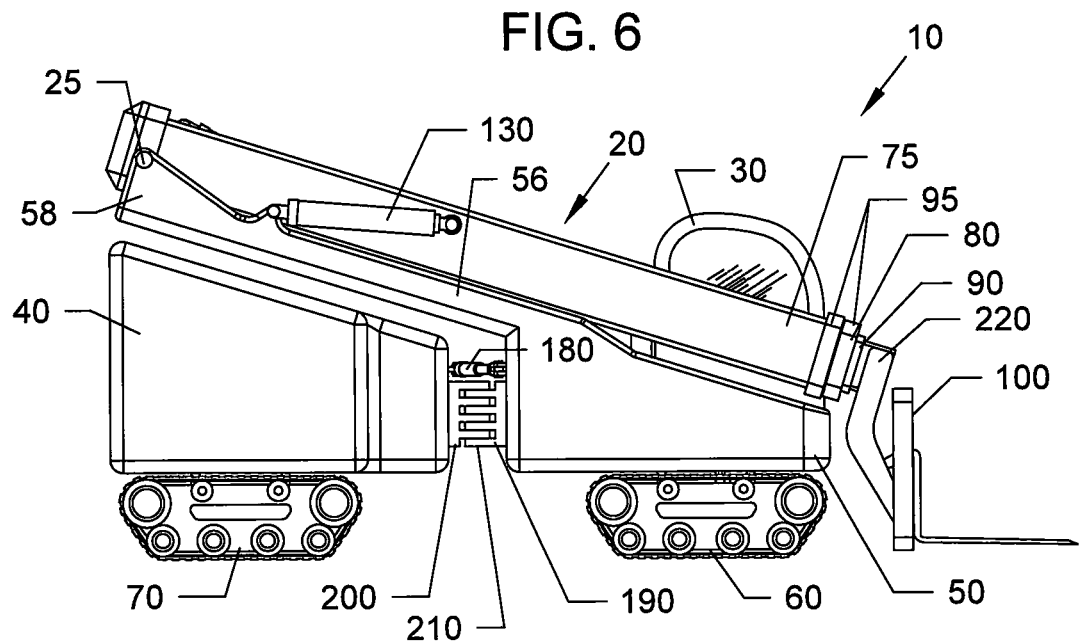
FIG. 6 is a left side view of the vehicle of FIG. 5.

FIG. 5 is a right side view of the vehicle 10 of FIG. 1 with cab 30 and telescoping boom 20 in a down position. FIG. 6 is a left side view of the vehicle 10 of FIG. 5. FIG. 7 is a top view of the vehicle 10 of FIG. 5. FIG. 8 is a bottom view of the vehicle 10 of FIG. 5. FIG. 9 is a front view of the vehicle 10 of FIG. 5. FIG. 10 is a rear view of the vehicle 10 of FIG. 5.

Figure 11:
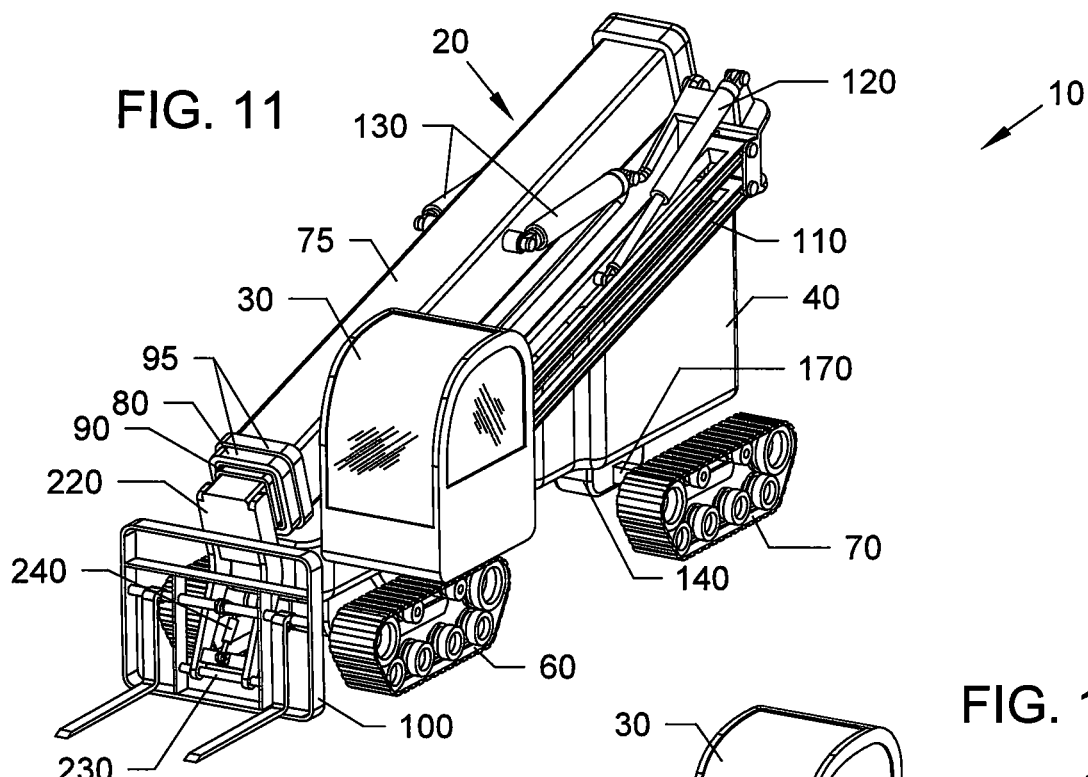
FIG. 11 is a front right perspective view of the vehicle of FIG. 1 with boom and articulating cab fully down.

FIG. 11 is a front right perspective view of the vehicle 10 of FIG. 1 with the telescoping boom 20 and articulating cab 30 fully down.

Figure 12:
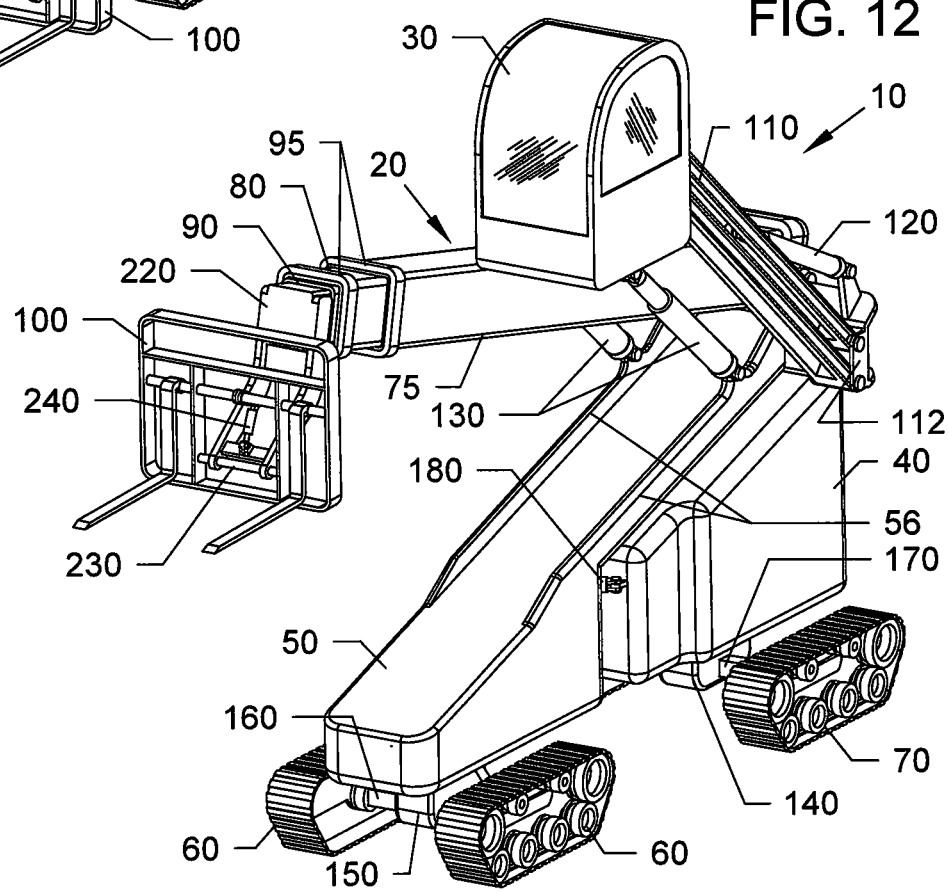
FIG. 12 is a front right perspective view of the vehicle of FIG. 12 with boom raised slightly and cab raised above boom for operator visibility.

FIG. 12 is a front right perspective view of the vehicle 10 of FIG. 12 with the telescoping boom 20 raised slightly and the cab 30 raised above the telescoping boom 20 for operator visibility.

Figure 13:
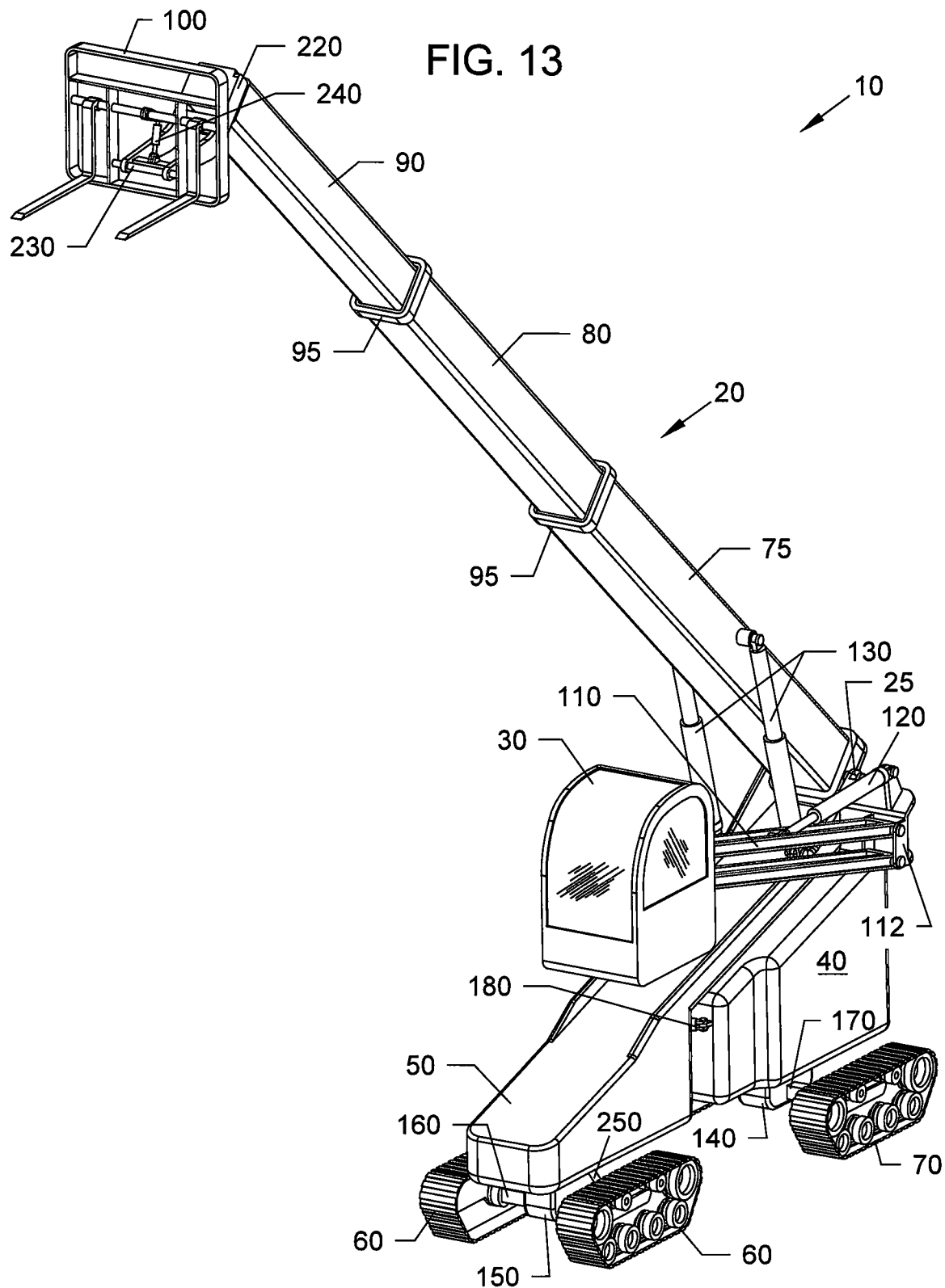
FIG. 13 is a front right perspective view of the vehicle of FIG. 12 with boom full raised and extended.

FIG. 13 is a front right perspective view of the vehicle 10 of FIG. 12 with the telescoping boom 20 full raised and extended.

Figure 14:
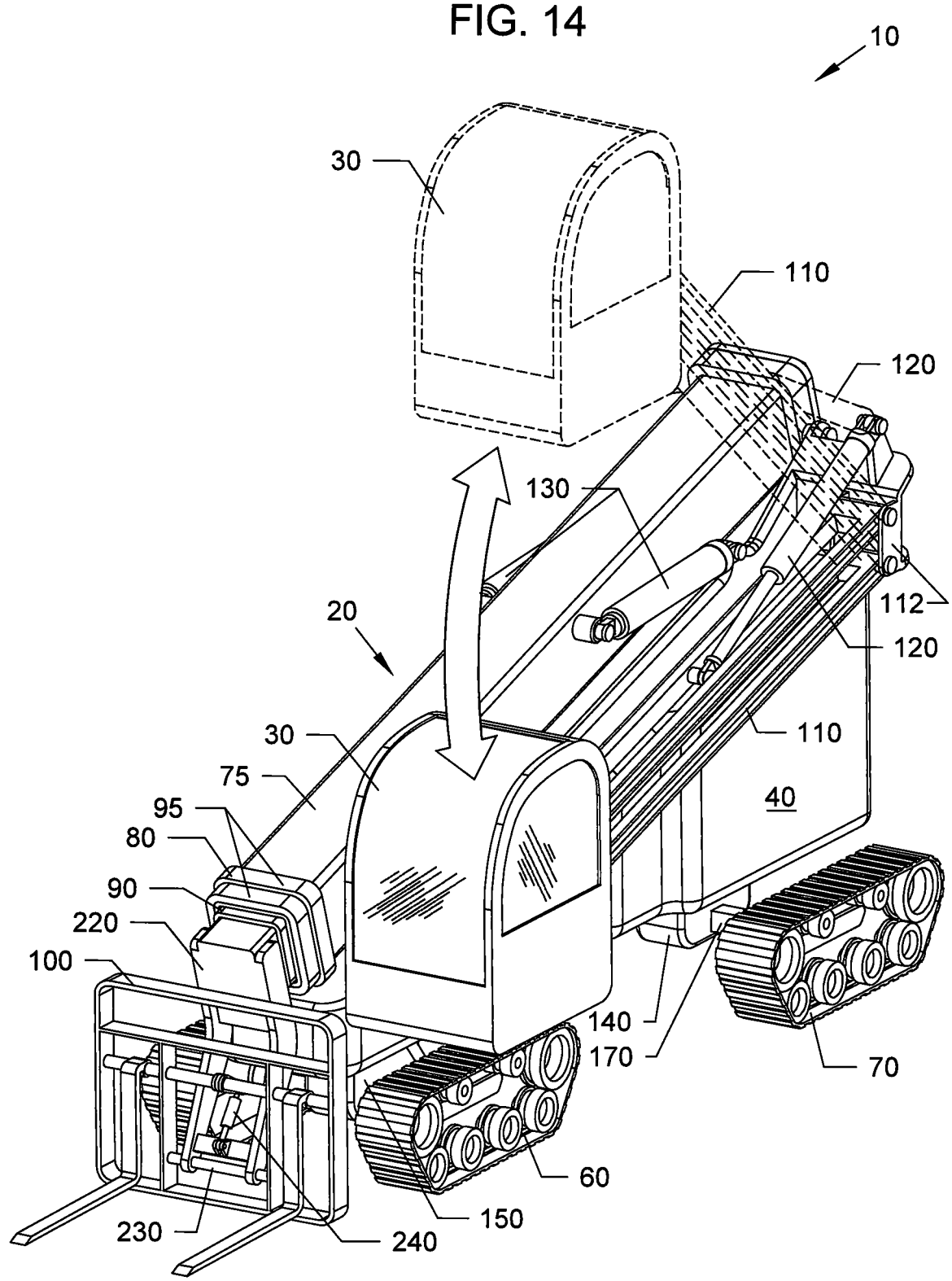
FIG. 14 is a front right perspective view of the vehicle of FIG. 11 showing range of motion of articulating cab.

FIG. 14 is a front right perspective view of the vehicle 10 of FIG. 11 showing range of motion of the articulating raiseable and lowerable cab 30.

Referring to FIGS. 1-14, the all terrain versatile vehicle 10 can include a two body parts, which includes a rear body 40 and front body 40. The rear body 40 can include an engine compartment 40, which houses the vehicle engine and is the foundation of a rear track assembly 70. The rear track assembly 70 can include a right track attached on a lower rear right side of the rear body 40 and a left track attached on a lower rear left side of the rear body 40. The front track assembly 60 can include a right front track attached on a lower front right side of the front body 50 and a left front track attached on a lower front left side of the front body 50.

The front body 50 with the superstructure can be attached to the rear body 40 with engine compartment, by superstructure hinge bracket 190 which is attached to an engine compartment engine bracket 200 by a hinge bracket pivot pin 210.

Referring to FIGS. 1-13, the telescoping boom 20 can include a large boom section 75 with a middle boom section 80 that can telescope in and out of, and a small boom section 90 that can telescope in and out of the middle boom section 80. Stops 95 can limit the fully retracted positions of the middle boom section 80 within the large boom section 75, and the small boom section within the middle boom section 80. Similar internal stops, not shown, can also limit the fully extended positions of the middle boom section 80 relative to the large boom section 75, and the small boom section 90 relative to middle boom section 80.

The bottom of the large boom section 75 can include a boom hinge pin 25 which rotatably attaches the telescoping boom 20 to an upper end super structure brackets 58, which together function as a boom hinge for allowing the telescoping boom 20 to pivot up and down relative to the upper end brackets 58 of the superstructure 50. A pair of hydraulic cylinders 130 (such as but not limited to those used in U.S. Pat. No. 6,024,232 to Helgesson and U.S. Pat. No. 4,632,630 to Maki et al., which are both incorporated by reference in their entirety) can be used. Each of the hydraulic cylinders 130 can have outer pivotal ends can be attached to both the large boom section 75 and the upper end superstructure brackets 58, where the telescoping hydraulic cylinders 130 can raise and lower the telescoping boom 20.

The superstructure 50 can have a side view that appears to have a generally triangular configuration, and the superstructure 50 can include an upper ramped top with raised sides 56 for capturing the telescoping boom 20 when in its' most lowered position.

The outer end of small boom section 90 of the telescoping boom 20 can include a fork assembly 100 with a fork bracket 220 attached thereon, by a fork assembly hinge pin 230, where a fork assembly hydraulic cylinder 240 (such as but not limited to those described in U.S. Pat. No. 4,632,630 to Maki et al., which is incorporated by reference in its' entirety) can adjust the angle of the fork bracket 220 relative to the telescoping boom 20.

Referring to FIGS. 1-14, the vehicle 10 can include a cab 30 that can be raised and lowered from an upper hinged bracket 118 attached to an upper end of parallel cab linkage arms 110 which are attached to a lower hinged bracket 112 which is attached to an upper portion bracket 54 of the superstructure 50. A hydraulic cylinder 120, such as those described in U.S. Pat. No. 5,890,557 to Glass et al., which is incorporated by reference in its' entirety, can be used to control the raising and lowering of the cab 30.

Figure 15:
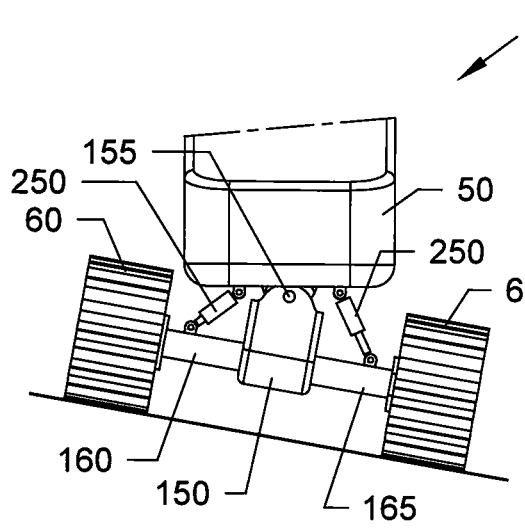
FIG. 15 is a lower front view of the front tracks, and front axle of the vehicle of the preceding figures showing how the axle is able to adjust, via pivot pin and hydraulic cylinders controlled by the operator, to ground level changes and keep the vehicle front and rear body and superstructure level.
Figure 16:
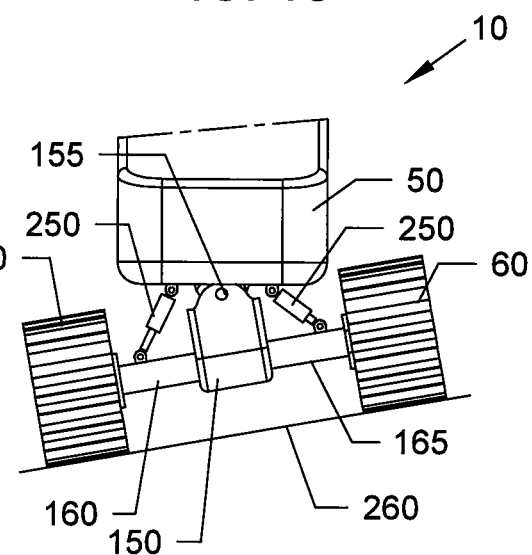
FIG. 16 is another view of FIG. 15 with the axle tilted in an opposite orientation.

FIG. 15 is a lower front view of the front track assembly 60 of the vehicle 10 which includes a front left track attached to a middle front track bracket 150 by a front left axle housing 160, and a front right track attached to the middle front track bracket by a front right axle 165, with the front track assembly tilted down to the right. FIG. 16 is another view of FIG. 15 with the front track assembly 60 tilted in an opposite orientation.

The axle housings 160, 165 are able to adjust, via bracket pivot pin 155 which attaches the bottom of the front body 50 to the middle front bracket 50. The front track assembly 60 is able to be tiltable up and down based on hydraulic cylinders 250 (such as those described in U.S. Pat. No. 5,180,028 to Perrenoud, Jr., which is incorporated by reference in its' entirety), controlled by an operator in the cab 30, to ground level changes and keep the vehicle front body 50 and rear body 40 and superstructure level.

Figure 17:
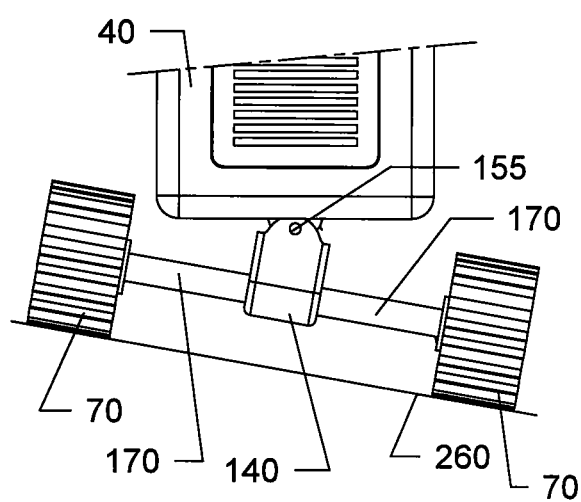
FIG. 17 is a lower rear view of the vehicle of the preceding figures of engine compartment, rear tracks, and rear axle showing how the axle is able to adjust to ground level changes via pivot pin. The engine compartment leveling feature does not have to be hydraulically powered and is free-pivoting and follows the lead of the superstructure.
Figure 18:
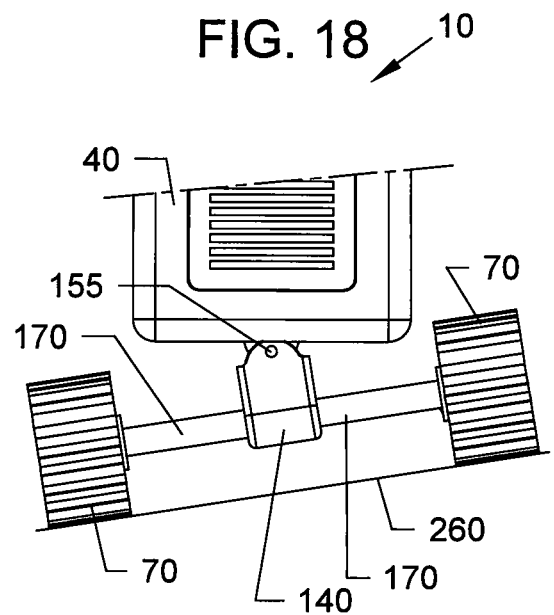
FIG. 18 is another view of FIG. 17 with the axle tilted an opposite orientation.

FIG. 17 is a lower rear view of the vehicle 10 of the preceding figures of engine compartment (rear body) 40, rear track assembly 70, and rear axle 170 showing how the axle 170 is able to adjust to ground level changes via pivot pin 155 that attached a bottom of the rear body 40 to a middle rear bracket 140. The engine compartment (rear body 40) leveling feature is not hydraulically powered and is free-pivoting and follows the lead of the superstructure (front body 50. FIG. 18 is another view of FIG. 17 with the axle 170 tilted an opposite orientation.

FIG. 19 is a bottom right perspective view of the vehicle 10 of the preceding figures showing the axle's 160, 165 and 170 and track assemblies 60, 70 parallel to one another and parallel to the superstructure (front body) 50. FIG. 20 is another perspective view of FIG. 19 showing how the front track assembly 60 with axles 160, 165 and pivoting bracket 150 and rear track assembly 70 with rear axle 170 and pivoting bracket 140 rotate about the axle hinge pins 155.

Figure 21:
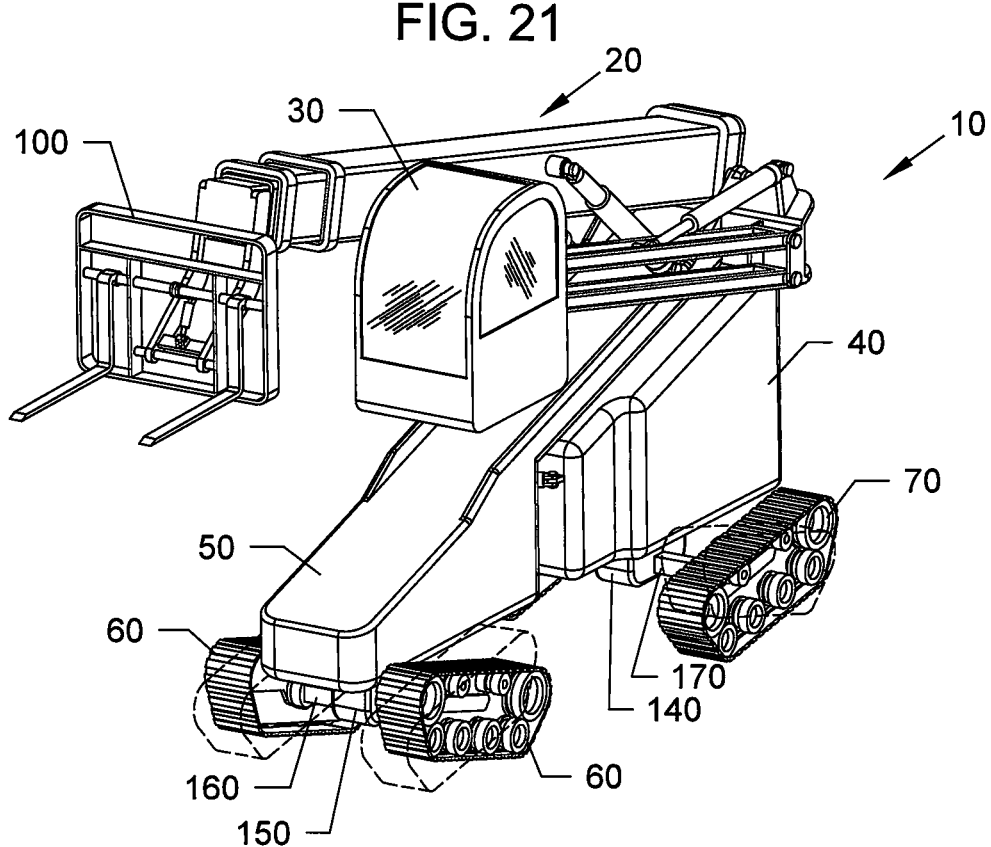
FIG. 21 is a top right perspective view of the vehicle of the preceding figures showing how the tracks articulate by rotating about and relative to their axles. The front tracks can also be locked in any position.
Figure 22:
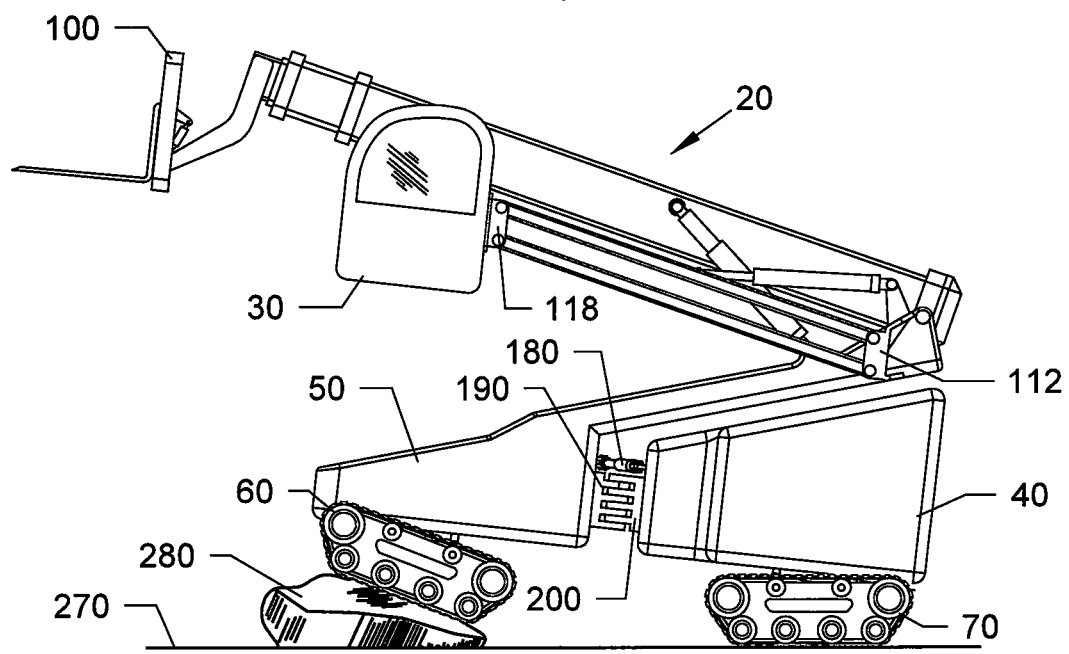
FIG. 22 is a right side view of vehicle of FIG. 21 showing the utility of the articulating tracks in overcoming an obstacle.

FIG. 21 is a top right perspective view of the vehicle 10 of the preceding figures showing how the track assemblies 60 and 70 can articulate by rotating about and relative to their axles 160, 165, and 170, respectively. The front track assemblies 160, 165 can also be locked in any position. FIG. 22 is a right side view of vehicle 10 of FIG. 21 showing the utility of the articulating tracks of the front track assembly 60 in overcoming an obstacle 280, such as but not limited to a rock, log, or other obstacle, and the like. The articulating track assemblies 60, 70 can be used when the vehicle traverses ground surfaces with obstacle(s) 280, and/or a relatively level ground surface 270 and/or ground surfaces that are not level such as those shown in FIGS. 15-18.

Figure 23:
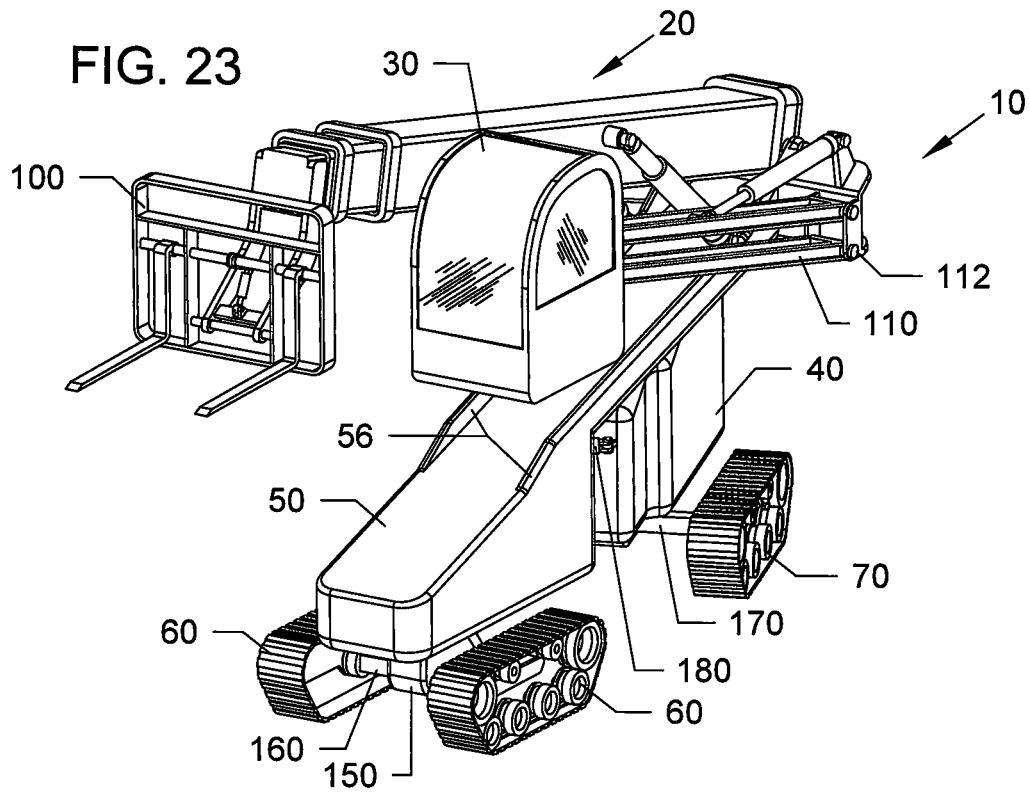
FIG. 23 is a front right perspective view of the vehicle of the preceding figures showing the rear engine compartment angled to the left relative to the superstructure on the front body.
Figure 24:
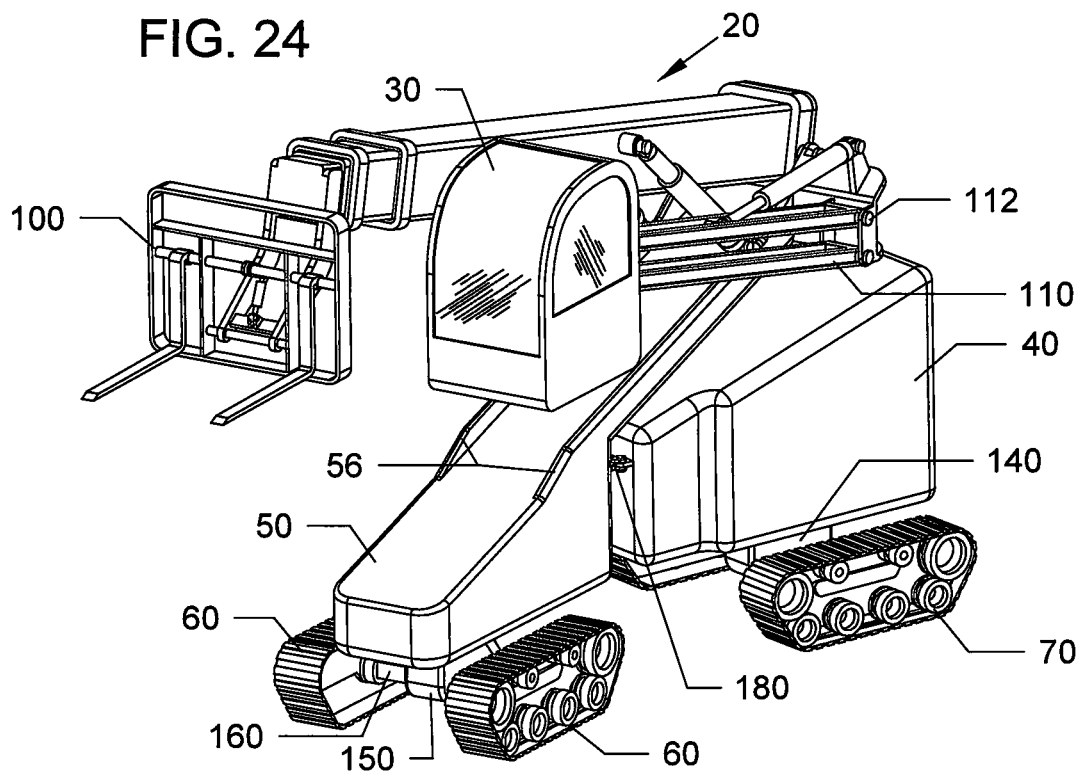
FIG. 24 is another view of FIG. 23 with the engine compartment angled to the right relative to the superstructure on the front body.

FIG. 23 is a front right perspective view of the vehicle 10 of the preceding figures showing the rear engine compartment (rear body) 40 angled to the left relative to the superstructure on the front body 50. FIG. 24 is another view of FIG. 23 with the engine compartment (rear body) 40 angled to the right relative to the superstructure on the front body 50.

Figure 25:
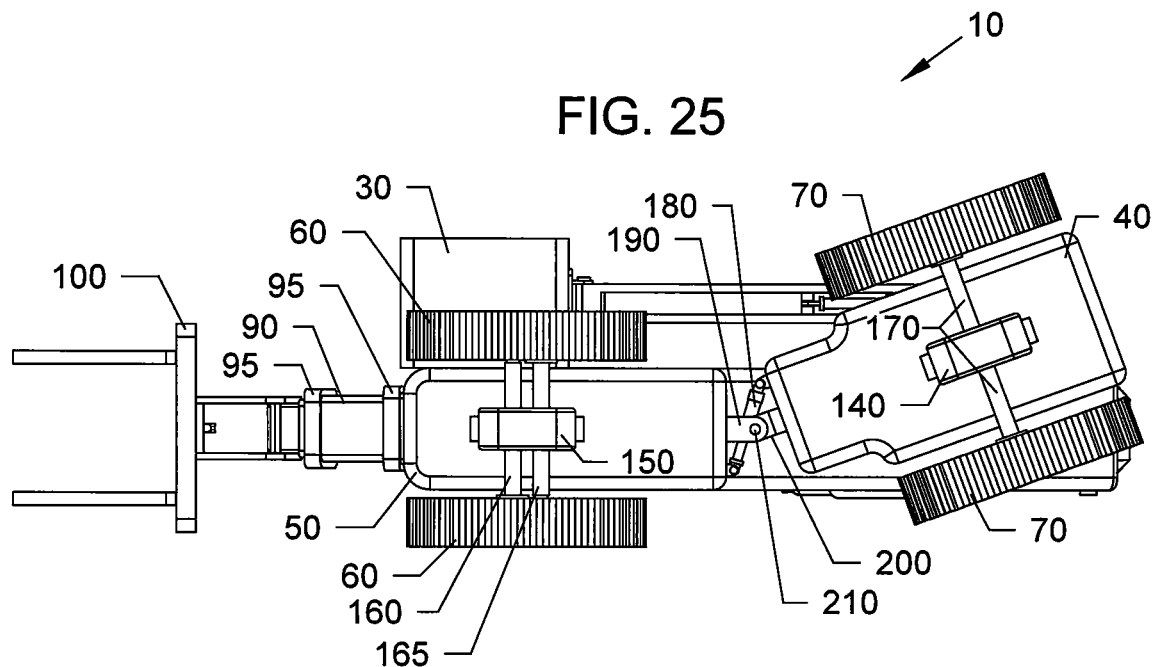
FIG. 25 is a bottom view of the vehicle of FIG. 24.
Figure 26:
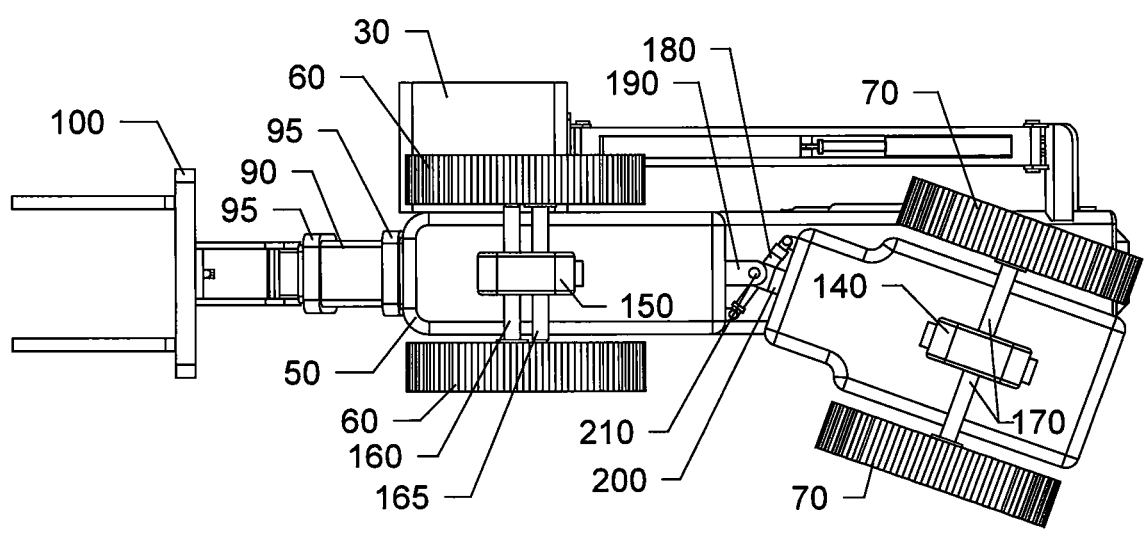
FIG. 26 is a bottom view of the vehicle of FIG. 23.

FIG. 25 is a bottom view of the vehicle 10 of FIG. 24. FIG. 26 is a bottom view of the vehicle 10 of FIG. 23.

Referring to FIGS. 5, 6, 8 and 22-26, the hinge components 190, 200, 210 allow for the front body 50 to articulate to the right or left relative to the rear body 40. A hydraulic cylinder(s), such as those previously described can be used to allow an operator in the cab 30 to control the angle orientation of the front body 50 to the rear body 40.

Figure 27:
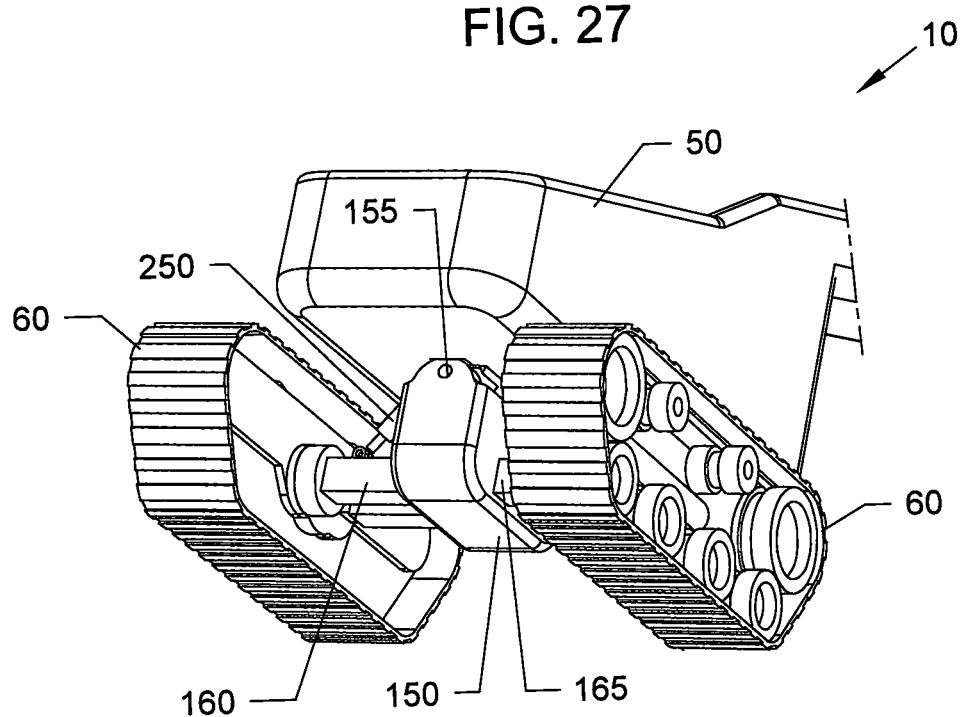
FIG. 27 is a front bottom perspective view of the front body with superstructure showing the axles and tracks, with the inner axles are retracted into the axle housings in this view.

FIG. 27 is a front bottom perspective view of the front body 50 with superstructure showing the axle housings 160, 165 and track assembly 60 comprising the left track and the right track, with the inner telescoping axles 163, 167 (shown in FIG. 28) being retracted into the respective axle housings 160, 165 in this view.

Figure 28:
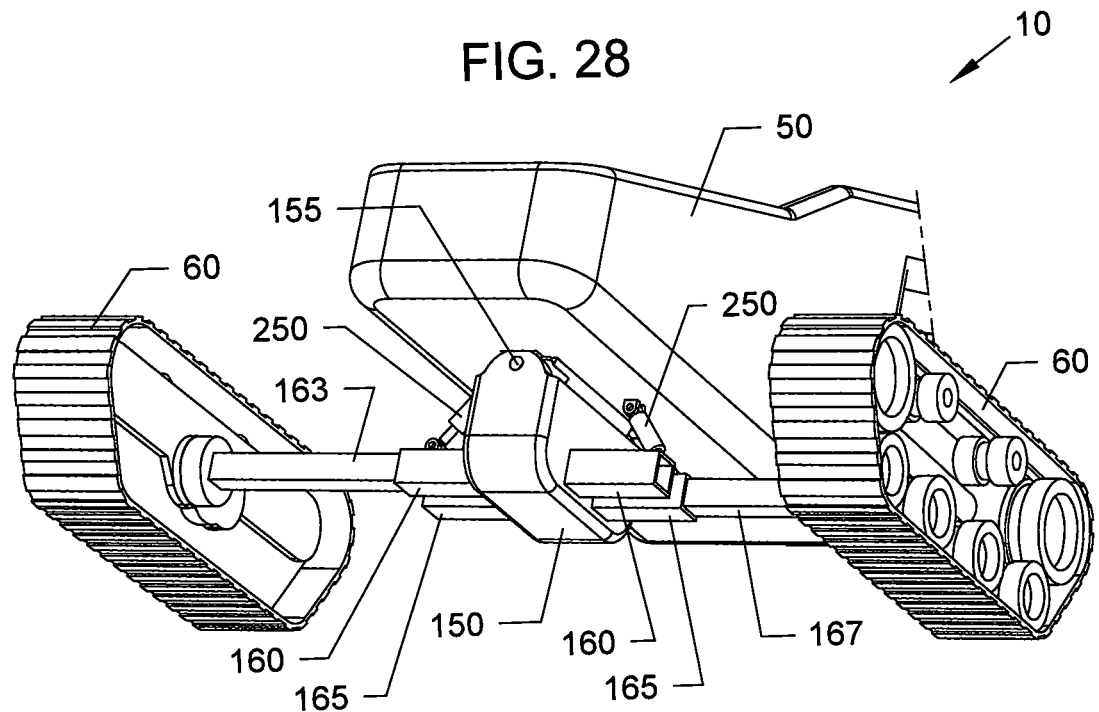
FIG. 28 is another view of FIG. 27 with the inner extendable axles fully extended. This places the tracks further away from the superstructure for increased stability.

FIG. 28 is another view of FIG. 27 with the inner extendable axles 163, 167 fully extended from their respective axle housings 160, 165, which places the right and left tracks further away from the superstructure (front body) 50 for increased stability over different ground surfaces.

Referring to FIGS. 27-28, a pair of hydraulic cylinders 250, such as those previously described can separately control each of the extendable inner axles 163, 167 as needed by the operator in the cab 30.

While the levelling features is shown in the preferred embodiment to not include the rear body (engine compartment) 40, the invention can also be used where both the front body (super structure) 50 and the rear body 50 both include hydraulic cylinder leveling controls.

Although the embodiments described above refer to hydraulic cylinder(s) with cylinders and pistons as telescoping members, for moving parts of the invention, other components can be used, such as but not limited to pneumatic cylinder(s), gears and sprockets, pulleys and motors, and the like can be used.

While the preferred embodiments show the use of a forklift attachments, other types of implements, such as but not limited to a shovel attachment, and the like, can be used.

Although the embodiments show a raiseable and lowerable cab, the cab can be in a fixed orientation relative to the vehicle, and not raisable or lowerable.

While the preferred embodiments show the use of extendable and retractable tracks, the invention can be used without extendable and retractable tracks, where the tracks are in a fixed length position relative to one another.

Although the tracks are shown in the preferred embodiments as oscillating, the vehicle tracks can be made without oscillating tracks, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:
1. An all terrain vehicle, comprising:
a front body with a front pair of tracks;
a rear body with an engine compartment and a rear pair of tracks;
an articulating hinge attached to a rear portion of the front body and a front portion of the rear body for allowing the front body and the rear body to articulate to one another;
an angled superstructure on the front body extending upwardly and rearwardly over the rear body;
an extendable boom having an inner end attached to an upper outer extended end of the angled superstructure; and
a forklift attached to an outer end of the boom, wherein the front pair of tracks includes:
a front middle bracket being attached underneath the front body;
a front single right axle housing having an inner end attached to the front middle bracket, and a right outer articulating end for allowing a right front track assembly to articulate relative to the right front axle housing; and
a front single left axle housing having an inner end attached to the front middle bracket, and a left outer articulating end for allowing a left front track assembly to articulate relative to the left front axle housing, so that each of the right front track assembly and the left front track assembly articulate up and down over raised obstacles on a ground surface;
a right oscillating lock for locking the right front track assembly in a fixed articulated right side orientation position; and
a left oscillating lock for locking the right front track assembly in a fixed articulated left side orientation position;
the front right single axle housing having a front telescoping single right axle for allowing a right track to extend inward and outward from a right side of the vehicle by the front telescoping single right axle; and
the front left single axle housing having a front telescoping single left axle for allowing a left track to extend inward and outward from a left side of the vehicle by the front telescoping single left axle.

2. The all terrain vehicle of claim 1, wherein the front pair of tracks includes:
the front middle bracket being pivotally attached to a front pivot point underneath the front body;
the front right axle housing for attaching the front middle bracket to a right front track; and
the front left axle housing for attaching the front middle bracket to a left front track, wherein the middle bracket allows for the front left track and the front right track of front pair of tracks to tilt up and down relative to the front body while the vehicle is traversing over uneven ground surfaces.

3. The all terrain vehicle of claim 2, further comprising:
a tilting control for controlling tilting angle of the front pair of tracks.

4. The all terrain vehicle of claim 3, wherein the tilting control includes hydraulics.

5. The all terrain vehicle of claim 1, wherein the rear pair of tracks includes:

a rear middle bracket being pivotally attached to a rear pivot point underneath the rear body;
a rear right axle housing for attaching the rear middle bracket to a rear right track; and
a rear left axle housing for attaching the rear middle bracket to a left rear track, wherein the rear middle bracket allows for the rear left track and the rear right track of rear pair of tracks to tilt up and down relative to the rear body while the vehicle is traversing over uneven ground surfaces and over raised obstacles.

6. The all terrain vehicle of claim 1, wherein the rear pair of tracks includes:
a rear middle bracket being attached underneath the rear body;
a rear right axle housing having an inner end attached to the rear middle bracket, and a right outer articulating end for allowing a right rear track assembly to articulate relative to the right rear axle housing; and
a rear left axle housing having an inner end attached to the rear middle bracket, and a left outer articulating end for allowing a left rear track assembly to articulate relative to the left rear axle housing, so that each of the right rear track assembly and the left rear track assembly articulate up and down over raised obstacles on a ground surface.

7. The all terrain vehicle of claim 1, wherein the extendable boom includes:
telescoping boom members for allowing the forklift to extend outward and inward relative to the upper outer extended end of the angled superstructure on the vehicle.

8. The all terrain vehicle of claim 7, further comprising:
a boom hinge member for allowing the boom to hinge up and down relative to the upper outer extended end of the angled superstructure.

9. The all terrain vehicle of claim 7, wherein the boom telescoping members include hydraulic cylinders.

10. The all terrain vehicle of claim 1, further comprising:
an articulating control for controlling articulating angle orientation of the articulating hinge attached between the front body and the rear body.

11. The all terrain vehicle of claim 10, wherein the articulating control includes:
telescoping members for the controlling of the articulating angle orientation of the articulating hinge attached between the front body and the rear body.

12. The all terrain vehicle of claim 11, wherein the telescoping members include hydraulic cylinders.

13. An all terrain vehicle, comprising:
a front body with a front pair of tracks;
a rear body with an engine compartment and a rear pair of tracks;
an articulating hinge attached to a rear portion of the front body and a front portion of the rear body for allowing the front body and the rear body to articulate to one another;
an angled superstructure on the front body extending upwardly and rearwardly over the rear body;
an extendable boom having an inner end attached to an upper outer extended end of the angled superstructure;
a forklift attached to an outer end of the boom;
a cab for a vehicle operator; and
an arm having a first hinged end for attachment to the cab, and a second hinged end for attachment to a side portion of the upper outer extended end of the angled superstructure, wherein the arm with the first hinged end and the second hinged end allows for the cab to articulate up to a raised position and down to a lowered position so that the cab in the raised position allows for visibility of both sides of the vehicle.

14. The all terrain vehicle of claim 13, further comprising: arm telescoping members for controlling the cab to articulate up to the raised position and down to the lowered position.

15. The all terrain vehicle of claim 14, wherein the arm telescoping members include hydraulic cylinders.

16. An all terrain vehicle, comprising:
a front body having a front right track and a front left track;
a rear body having a rear right track and a rear left track;
a pivot member between the front body and the rear body for allowing the front body and the rear body to swing sideways relative to one another;
an angled superstructure on the front body extending upwardly and rearwardly over the rear body;
an extendable boom attached to the angled superstructure by a hinge; and
a tool implement attached to an outer end of the boom wherein the front body includes:
a front middle bracket being attached underneath the front body;
a front right single axle housing having a front telescoping single right axle to allowing the front right track to extend inward and outward from a right side of the vehicle by the front single telescoping right axle; and
a front left single axle housing having a front telescoping single left axle to allowing the front left track to extend inward and outward from a left side of the vehicle by the front single telescoping left axle.

17. The all terrain vehicle of claim 16, wherein the tool implement includes: a forklift attachment.

18. An all terrain vehicle, comprising:
a front section with a front pair of tracks;
a rear section with an engine and a rear pair of tracks;
an articulating hinge attached to a rear portion of the front section and a front portion of the rear section for allowing the front section and the rear section to articulate to one another;
an angled superstructure on the front section extending upwardly and rearwardly over the rear section;
an extendable boom having an inner end attached to an upper outer extended end of the angled superstructure;
a forklift attached to an outer end of the boom;
an operator cab; and
an arm having a first hinged end for attachment to the cab, and a second hinged end for attachment to a side portion of the upper outer extended end of the angled superstructure, wherein the arm with the first hinged end and the second hinged end allows for the cab to articulate up to a raised position and down to a lowered position so that the cab in the raised position allows for visibility of both sides of the vehicle.

* * * * *